US008290493B2

(12) United States Patent
Park et al.

(10) Patent No.: US 8,290,493 B2
(45) Date of Patent: Oct. 16, 2012

(54) APPARATUS AND METHOD FOR TRAFFIC FORWARDING IN A WIRELESS COMMUNICATION SYSTEM

(75) Inventors: Eun-Chan Park, Seongnam-si (KR); Han-Seok Kim, Seoul (KR); Jae-Young Kim, Yongin-si (KR); Do-Hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 12/290,898

(22) Filed: Nov. 5, 2008

(65) Prior Publication Data

US 2009/0117902 A1    May 7, 2009

(30) Foreign Application Priority Data

Nov. 6, 2007  (KR) ................. 10-2007-0112843

(51) Int. Cl.
*H04W 36/00* (2009.01)
(52) U.S. Cl. ........ 455/437; 370/331; 370/401; 370/352; 455/452.2; 455/436; 455/438
(58) Field of Classification Search .......... 455/436–439, 455/443–444, 456.5, 561, 379, 33.2
See application file for complete search history.

(56) References Cited

U.S. PATENT DOCUMENTS

| 2001/0007560 | A1* | 7/2001  | Masuda et al.  | 370/401 |
| 2002/0094837 | A1* | 7/2002  | Hamabe et al.  | 455/522 |
| 2007/0293226 | A1* | 12/2007 | Lee et al.     | 455/436 |
| 2008/0151871 | A1* | 6/2008  | Parts et al.   | 370/352 |
| 2008/0274741 | A1* | 11/2008 | Liao et al.    | 455/436 |
| 2009/0262701 | A1* | 10/2009 | Motegi et al.  | 370/331 |

FOREIGN PATENT DOCUMENTS

| KR | 1020030082585 A | 10/2003 |
| KR | 1020090096504 A | 9/2009 |
| WO | WO 03/096553 A2 | 11/2003 |
| WO | WO 2007/052747 A1 | 5/2007 |
| WO | WO2007052747 | * 5/2007 |

* cited by examiner

*Primary Examiner* — Marcos Batista
*Assistant Examiner* — Keith Fang

(57) ABSTRACT

An apparatus and method for data transmission in a base station (BS) of a wireless communication system are provided, storing data to be transmitted to a mobile station which performing handover to a target base station; confirming a quantity of stored data; determining whether to transmit the stored data to the target based at least partly on the confirmed quantity of the stored data; transmitting the stored data to the target base station when the base station determines to transmit the stored data to the target base station.

20 Claims, 3 Drawing Sheets ofieldAPPARATUS AND METHOD FOR TRAFFIC
FORWARDING IN A WIRELESS
COMMUNICATION SYSTEM

CROSS-REFERENCE TO RELATED PATENT
APPLICATION

The present application claims the benefit under 35 U.S.C. §119(a) of a Korean Patent Application filed in the Korean Intellectual Property Office on Nov. 6, 2007 and assigned Serial No. 10-2007-0112843, the entire disclosure of which is hereby incorporated by reference.

TECHNICAL FIELD OF THE INVENTION

The present invention generally relates to an apparatus and a method for handover of a mobile station (MS) in a wireless communication system. Particularly, the present invention relates to an apparatus and a method for transmitting stored data for an MS to a target base station (BS) in a serving BS of the wireless communication system when the MS performs handover to the target BS. Herein, the serving BS provides a service to the MS before handover, and the target BS provides a service to the MS after handover.

BACKGROUND OF THE INVENTION

A wireless communication system supports mobility of an MS using handover. For example, the MS selects a target BS from among neighbor BSs of a serving BS when the MS performs handover. After, the MS releases from the serving BS and connects to the target BS.

As described above, an MS releases from a serving BS and connects to a target BS for handover. Therefore, there occurs data loss because the MS is disconnected from both the serving BS and the target BS temporarily.

In order to solve this problem, a serving BS temporarily stores data to be transmitted to an MS when the serving BS releases from the MS. The serving BS reduces data loss for the MS incurred during handover by transmitting stored data for the MS to the target BS when the MS connects to the target BS. Herein, the serving BS transmits data to the target BS via a backhaul. Hereinafter, it is assumed that stored data to be transmitted to the MS in the serving BS is referred to as handover data.

The serving BS transmits the handover data to the target BS as soon as MS is connected to the target BS.

However, the handover data transmitted from the serving BS may be lost, and transmission time delay may occur due to a congested situation when a backhaul capacity is limited or an available backhaul capacity is not enough.

Therefore, there is a need to provide an improved method and apparatus for solving the above problem.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for transmitting stored data for an MS to a target BS based at least partly on an available backhaul capacity in a serving BS of a wireless communication system when the MS performs handover to the target BS.

Another aspect of exemplary embodiments of the present invention provides an apparatus and method for transmitting stored data for an MS to a target BS based at least partly on a quantity of stored data to a line card buffer in a serving BS of a wireless communication system when the MS performs handover to the target BS.

In accordance with an aspect of exemplary embodiments of the present invention, there is provided a method for data transmission in a base station (BS) of a wireless communication system. The method includes storing data to be transmitted to an MS which is performing handover to a target BS; confirming a quantity of stored data; determining whether to transmit the stored data to the target BS based at least partly on the confirmed quantity of stored data; and transmitting the stored data to the target BS when the BS determines to transmit the stored data to the target BS.

In accordance with another aspect of exemplary embodiments of the present invention, there is provided an apparatus for data transmission in a base station (BS) of a wireless communication system includes a storage for storing data to be transmitted to an MS which is performing handover to a target BS; a state confirmer for confirming a quantity of stored data in the storage; a transmission controller for determining whether to transmit the stored data to the target BS based at least partly on the confirmed quantity of stored data; and a transmitter for transmitting the stored data to the target BS when the BS determines to transmit the stored data to the target BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF EXEMPLARY EMBODIMENTS

Figure 1:
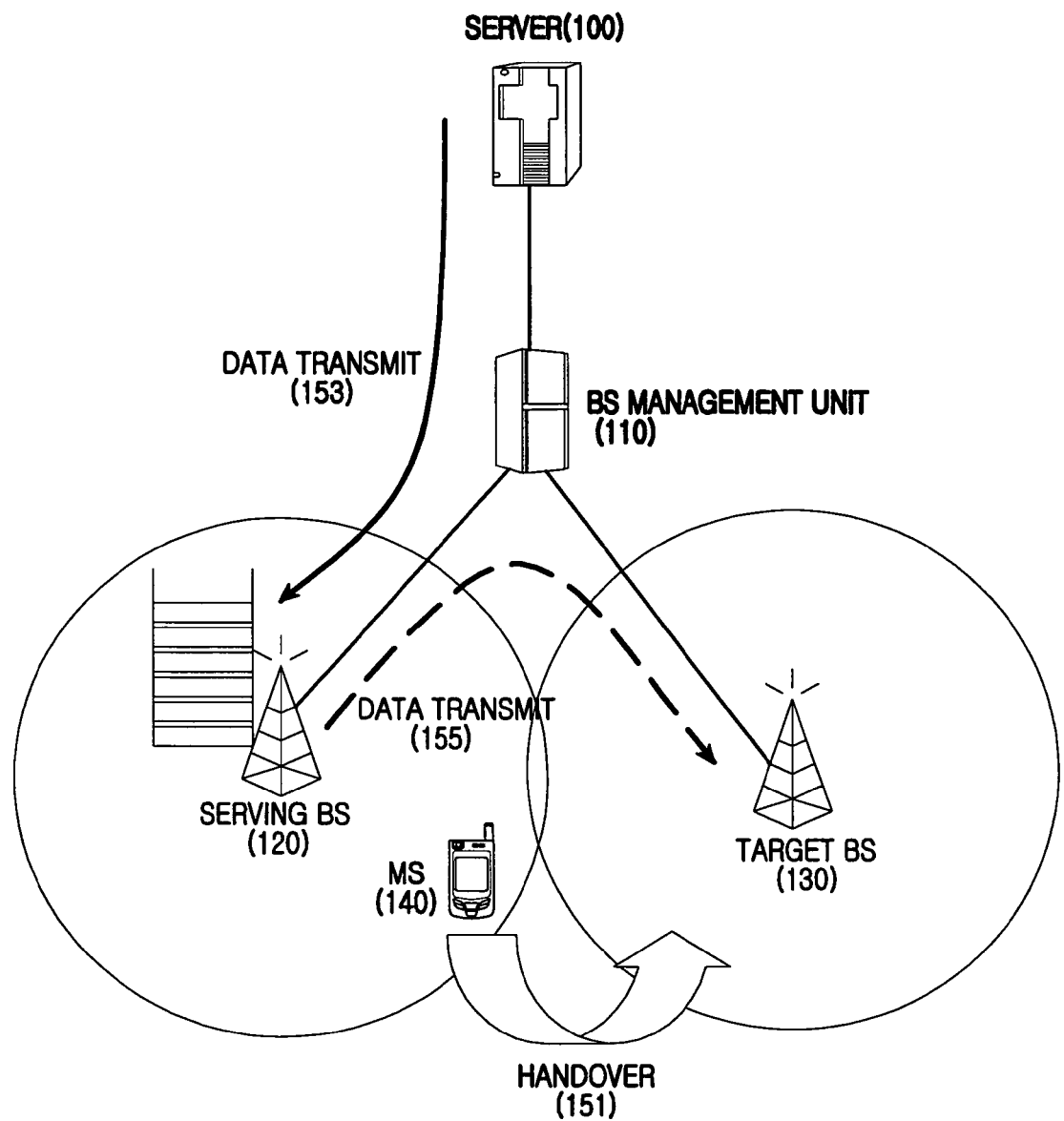
FIG. 1 illustrates a conventional procedure for operating in a wireless communication system.
Figure 2:
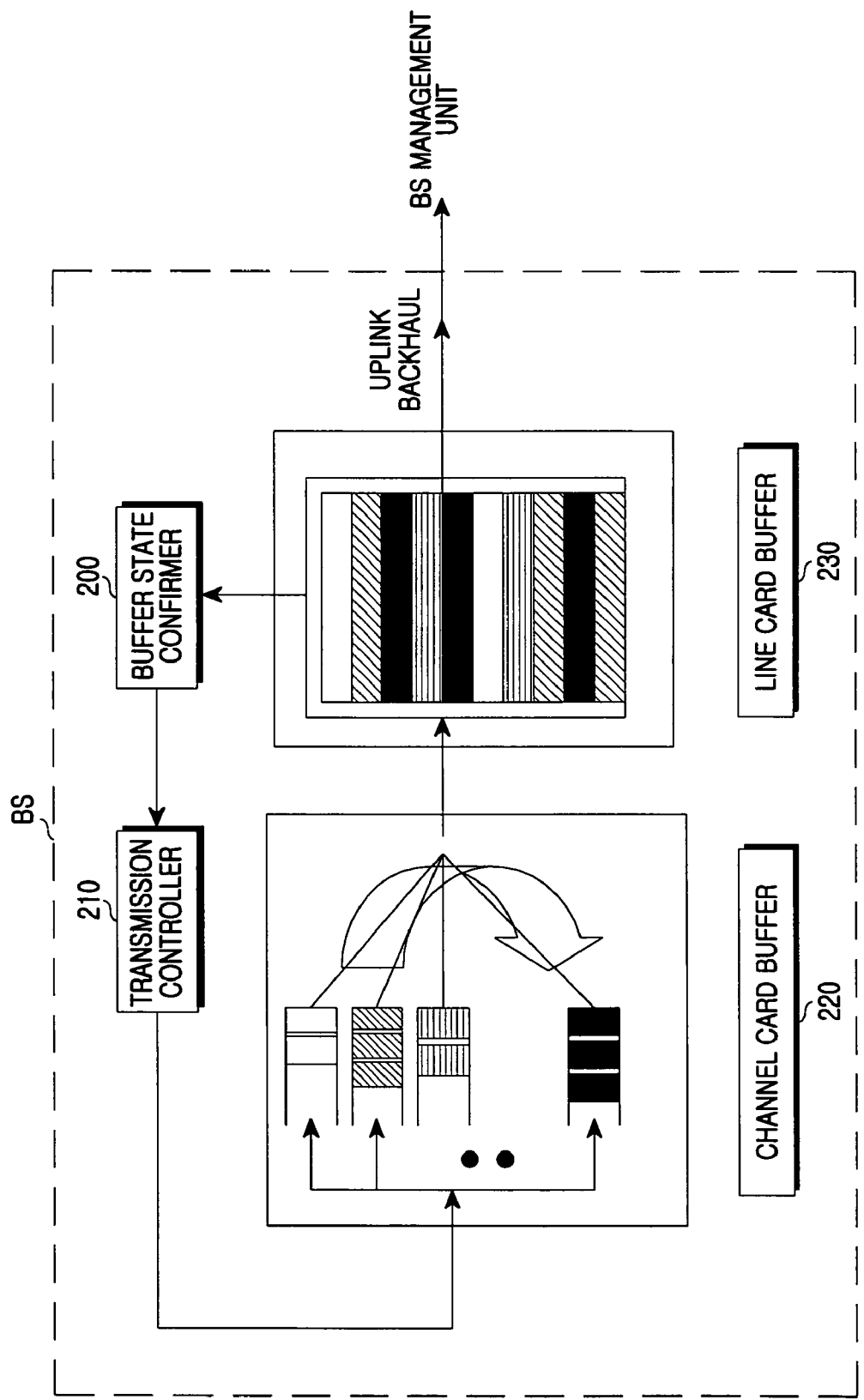
FIG. 2 is a block diagram illustrating a construction of a base station in a wireless communication system according to an exemplary embodiment of the present invention.
Figure 3:
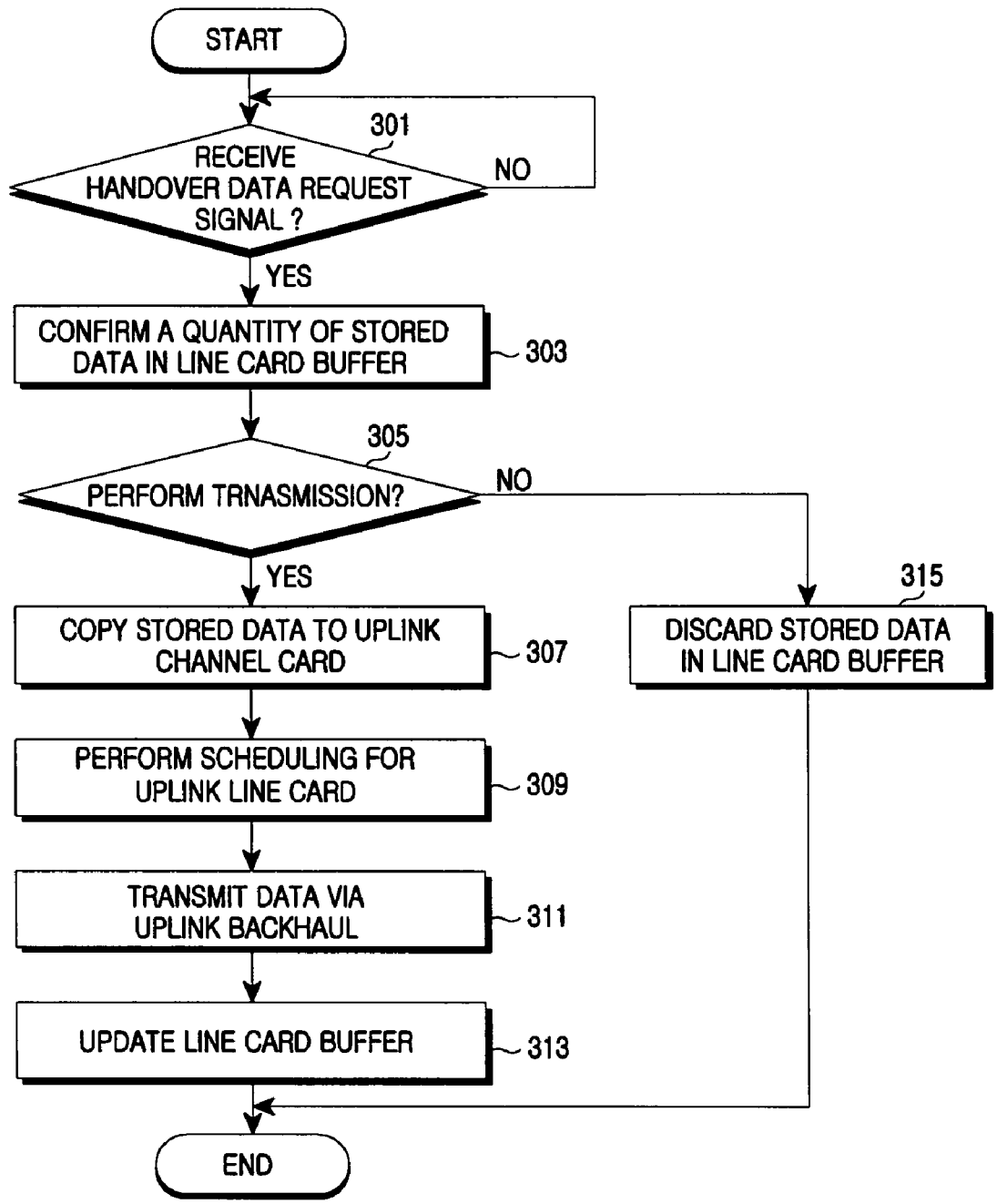
FIG. 3 is a flow diagram illustrating a process of forwarding traffic according to a handover of a mobile station at a base station of a wireless communication system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention are intended to provide a scheme for transmitting data for a mobile station (MS) to a target base station (BS) based at least partly on an available backhaul capacity in a serving BS of a wireless communication system. Herein, the serving BS provides a service to an MS before handover, and the target BS provides a service to an MS after handover.

The serving BS stores data to be transmitted to the MS when the MS releases from the serving BS. When the MS connects to the target BS, the serving BS transmits stored data for the MS to the target BS as shown in FIG. 1 to reduce data loss of the MS.

FIG. 1 illustrates a conventional procedure for operating in a wireless communication system.

As shown in FIG. 1, the wireless communication system includes a server 100, a BS management unit 110, a BS 120, 130, and an MS 140.

The MS 140 transmits and receives data with the serving BS 120. Herein, the MS 140 is located in a service area of the serving BS 120.

The serving BS 120 transmits received data from the server 100 to the MS 140 via the BS management unit 110. As well, the serving BS 120 transmits received data from the MS 140 to the BS management unit 110.

If the MS 140 performs a handover to the target BS 130 in step 151, the MS 140 releases from the serving BS 120 and connects to the target BS 130.

Before the MS 140 connects to the target BS 130, the BS management unit 110 transmits data for the MS 140 to the serving BS 120 in step 153. Therefore, the serving BS 120 stores received data for the MS 140 from the BS management unit 110 temporarily.

The target BS 130 requests transmission of stored data for the MS 140 to the serving BS 120 when the MS 140 connects to the target BS 130.

When the target BS 130 requests transmission of stored data from the serving BS 120, the serving BS 120 confirms an available capacity of a backhaul from the serving BS 120 to the target BS 130. If the available capacity of the backhaul is enough, the serving BS 120 transmits stored data for the MS 140 to the target BS 130 via the backhaul in step 155.

However, the serving BS 120 does not transmit stored data for the MS 140 to the target BS 130 when the available capacity of the backhaul is not enough. At this time, the serving BS 120 discards stored data for the MS 140.

As described above, a serving BS stores data to be transmitted to an MS, when the MS releases from the serving BS. After, the serving BS transmits stored data for the MS to a target BS based at least partly on an available backhaul capacity.

For another example, a serving BS stores data to be transmitted to an MS when the MS releases from the serving BS. After, the serving BS transmits stored data for the MS to a target BS based at least partly on a quantity of stored data in a buffer as shown in FIG. 2.

FIG. 2 is a block diagram illustrating a construction of a base station in a wireless communication system according to an exemplary embodiment of the present invention. Herein, the BS is a serving BS.

As shown in FIG. 2, the serving BS includes a buffer state confirmer 200, a transmission controller 210, a channel card buffer 220, and a line card buffer 230.

The channel card buffer 220 stores copied uplink data in a channel card temporary. Herein, the channel card processes uplink data.

The line card buffer 230 stores copied uplink data in a line card temporary. Herein, the line card processes uplink data.

The buffer state confirmer 200 confirms a quantity of cumulated data in the line card buffer 230 periodically and reports the confirmed quantity of cumulated data to the transmission controller 210 periodically. For example, the buffer state confirmer 200 compares the confirmed quantity of cumulated data in the line card buffer 230 with a preset reference value and provides the result of the comparison to the transmission controller 210. At this time, the buffer state confirmer 200 provides the result of the comparison to the transmission controller 210 using a state variable of one bit. When the quantity of cumulated data in the line card buffer 230 is greater than the reference value, the buffer state confirmer 200 provides the state variable which is set at 1 to the transmission controller 210. By contrast, the buffer state confirmer 200 provides the state variable which is set at 0 to the transmission controller 210 when the quantity of cumulated data in the line card buffer 230 is less than the reference value.

When the quantity of cumulated data in the line card buffer 230 is similar to the reference value, the buffer state confirmer 200 sets the state variable at 0 or 1 iteratively. In order to prevent this problem, the buffer state confirmer 200 uses a hysteresis to set the state variable at 0 or 1.

For example, the buffer state confirmer 200 sets the state variable at 1 when the quantity of cumulated data plus α is greater than the reference value. By contrast, the buffer state confirmer 200 sets the state variable at 0 when the quantity of cumulated data plus α is less than the reference value. Herein, the α is a hysteresis variable.

At this time, the serving BS sets the reference value differently depending on whether the serving BS supports Automatic Repeat reQuest (ARQ).

When the serving BS does not support ARQ, the serving BS calculates the reference value as show in Equation 1:

$$B_{th} = T_{narq} \times C_b. \quad \text{[Eqn. 1]}$$

In Equation 1, $B_{th}$ denotes a reference value which is determined by the serving BS, $T_{narq}$ denotes a maximum allowance time for transmitting data to an MS, $C_b$ denotes a minimum value in an uplink backhaul capacity of the serving BS and a downlink backhaul capacity of neighbor BSs of the serving BS. For example, $T_{narq}$ denotes a maximum delay time of an MS.

The serving BS in Equation 1 transmits data at a speed of $C_b$ within $T_{narq}$. Therefore, new data which flows into the line card buffer 230 is transmitted within the time delay which is fewer than $T_{narq}$ when a quantity of cumulated data in the line card buffer 230 is less than a product of $T_{narq}$ and $C_b$. By contrast, new data which flows into the line card buffer 230 is not transmitted within the time delay which is fewer than $T_{narq}$ when a quantity of cumulated data in line card buffer 230 is greater than the product of $T_{narq}$ and $C_b$.

When the serving BS supports ARQ, the serving BS calculates the reference value as show in Equation 2. Herein, the assumption is that a line card transmits cumulated data in the line card buffer 230 at a speed which is fixed ($C_b$) by performing a rata shaping.

$$B_{th} = T_{arq} \times C_b - (W_{arq} \times B_{arq}).$$ [Eqn. 2]

In Equation 2, $B_{th}$ denotes a reference value which is determined by the serving BS, $T_{narq}$ denotes a maximum allowance time for transmitting data to an MS, $C_b$ denotes a minimum value in an uplink backhaul capacity of the serving BS and a downlink backhaul capacity of neighbor BSs of the serving BS, $W_{arq}$ denotes ARQ window size, $B_{arq}$ denotes ARQ block size. Herein, the assumption is that the serving BS uses a Transmission Control Protocol (TCP) as a transport protocol, and it is required that the serving BS transmits data to a target BS within a TCP timeout. Therefore, $T_{narq}$ is set based at least partly on a TCP timeout. For example, $T_{narq}$ is set to less than half of a TCP timeout.

When the serving BS supports ARQ, the serving BS sets the reference value based at least partly on a product of $T_{narq}$ and $C_b$ as shown in Equation 2.

When the serving BS supports ARQ, the serving BS transmits stored data for an MS and ARQ data via a backhaul. If the serving BS transmits the ARQ data, the serving BS can transmit data at a maximum rate given by the product of $W_{arq}$ and $B_{arq}$. Therefore, the serving BS obtains a reference value by subtracting a product of $W_{arq}$ and $B_{arq}$ from a product of $T_{narq}$ and $C_b$ as shown in Equation 2.

When the transmission controller 210 receives a request signal for transmitting data from the target BS, the transmission controller 210 confirms a quantity of cumulated data in the line card buffer 230 periodically and determines whether the transmission controller 210 transmits cumulated data to the target BS using the confirmed result.

When the quantity of the cumulated data is greater than a reference value, the transmission controller 210 instructs the serving BS to transmit the cumulated data in the line card buffer 230 to the target BS.

When the quantity of cumulated data is less than the reference value, the transmission controller 210 instructs the serving BS not to transmit the cumulated data in the line card buffer 230 to the target BS. The transmission controller 210 discards cumulated data in the line card buffer 230.

The transmission controller 210 transmits a response signal with the received state variable when the transmission controller 210 receives the state variable. Therefore, the buffer state confirmer 200 retransmits the state variable when the confirm signal is not received within a preset time.

In another exemplary embodiment, the buffer state confirmer 200 compares a confirmed quantity of cumulated data in the line card buffer 230 with a preset reference value periodically and provides the result of the comparison to the transmission controller 210 periodically.

On the other hand, the buffer state confirmer 200 compares a confirmed quantity of cumulated data in the line card buffer 230 with a preset reference value when the buffer state confirmer 200 receives a request signal for transmitting stored data in the line card buffer 230 from the transmission controller 210. After, the buffer state confirmer 200 provides the result of the comparison to the transmission controller 210.

FIG. 3 is a flow diagram illustrating a process of forwarding traffic according to a handover of a mobile station at a base station of a wireless communication system according to an exemplary embodiment of the present invention.

As shown in FIG. 3, a BS confirms whether a request signal for transmitting stored data in a line card buffer of the BS is received from a target BS in step 301.

When the BS receives the request signal, the BS confirms a quantity of cumulated data in a line card buffer in step 303.

In step 305, the BS compares the confirmed quantity of cumulated data in the line card buffer with a preset reference value and determines whether the BS transmits cumulated data to the target BS according to the result of the comparison.

If the quantity of cumulated data in the line card buffer is less than the reference value, the BS copies stored data to an uplink channel card in step 307.

In step 309, the BS performs scheduling for copied stored data. For example, the BS performs scheduling based on a Differentiated Service Code Point (DSCP). The BS allocates a DSCP value which has a highest priority level to the copied stored data. After, the BS performs priority scheduling for copied signal according to a priority level of DSCP. Also, the BS allocates a Weighted Round Robin (WRR) to the copied data according to the DSCP value. After, the BS performs scheduling for copied data.

In step 311, the BS transmits selected data through scheduling to the target BS via a backhaul.

In step 313, the BS updates the quantity of cumulated data in the line card buffer. The BS decreases the quantity of cumulated data in the line card buffer according to the size of the data transmitted via the backhaul.

By contrast, the BS discards handover data when the quantity of cumulated data in the line card buffer is greater than the reference value in step 305.

Next, the BS finishes this process.

In another exemplary embodiment, the BS confirms a quantity of cumulated data in the line card buffer when the BS receives a request signal for transmitting stored data from the target BS.

On the other hand, the BS confirms a quantity of cumulated data in the line card buffer periodically. Therefore, the BS determines whether the BS transmits a handover data using recently confirmed quantity of cumulated data in line card buffer.

As set forth above, a serving BS of a wireless communication system stores data to be transmitted to an MS when the MS is disconnected. After, the serving BS transmits stored data to a target BS based at least partly on an available backhaul capacity. Therefore, the wireless communication system prevents data loss and a decrease of throughput.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for data transmission in a base station (BS) of a wireless communication system, comprising:
   storing data to be transmitted to a mobile station which is performing a handover to a target base station;
   confirming a quantity of a stored data;
   comparing the quantity of stored data with a predetermined reference value, the reference value based on a maximum time allowable for transmitting data to the mobile station and a minimum of an uplink backhaul capacity of the BS and a downlink backhaul capacity of neighbor base stations; and transmitting the stored data to the target base station when the confirmed quantity of stored data is less than the reference value.

2. The method of claim 1, wherein storing the data comprises:
storing data to be transmitted to the mobile station in a line card buffer which processes uplink data.

3. The method of claim 1, wherein confirming a quantity of the stored data comprises:
confirming the quantity of stored data when the base station receives a request signal for transmitting the stored data from the target base station.

4. The method of claim 1, wherein confirming a quantity of stored data comprises:
confirming a quantity of stored data periodically.

5. The method of claim 1, wherein the reference value is represented by the equation $$B_{th} = T_{narq} \times C_b$$

where $B_{th}$ denotes the predetermined reference value, $T_{narq}$ denotes the maximum time allowable for transmitting data to the mobile station, and $C_b$ denotes the minimum of the uplink backhaul capacity of the BS and the downlink backhaul capacity of the neighbor base stations.

6. The method of claim 1, further comprising:
determining not to transmit the stored data to the target base station when the quantity of stored data is greater than the reference value.

7. The method of claim 1, wherein the reference value is further based on a maximum size of an Automatic Repeat reQuest (ARQ) block and an ARQ window size.

8. The method of claim 1, further comprising:
determining whether a request signal for transmitting the stored data is received from the target base station;
wherein the base station determines whether to transmit the stored data when the request signal for transmitting the stored data is received from the target base station.

9. The method of claim 1, wherein transmitting the stored data comprises:
transmitting the stored data to the target base station via a backhaul.

10. The method of claim 1, further comprising discarding the stored data from a line card buffer when the base station determines to not transmit the stored data to the target base station.

11. An apparatus for data transmission in a base station (BS) of a wireless communication system, comprising:

a storage configured to store data to be transmitted to a mobile station which is performing a handover to a target base station;

a state confirmer configured to confirm a quantity of stored data in the storage;

a transmission controller configured to compare the quantity of stored data with a predetermined reference value and determine to transmit the stored data to the target base station when the confirmed quantity of stored data is less than the reference value, the reference value based on a maximum time allowable for transmitting data to the mobile station and a minimum of an uplink backhaul capacity of the BS and a downlink backhaul capacity of neighbor base stations; and a transmitter configured to transmit the stored data to the target base station when the base station determines to transmit the stored data to the target base station.

12. The apparatus of claim 11, wherein the storage is a line card buffer which processes uplink data.

13. The apparatus of claim 11, wherein the state confirmer confirms the quantity of stored data in the storage when a request signal for transmitting the stored data is received from the target base station.

14. The apparatus of claim 11, wherein the state confirmer confirms the quantity of stored data in the storage periodically.

15. The apparatus of claim 11, wherein the reference value is represented by the equation $$B_{th} = T_{narq} \times C_b$$

where $B_{th}$ denotes the predetermined reference value, $T_{narq}$ denotes the maximum time allowable for transmitting data to the mobile station, and $C_b$ denotes the minimum of the uplink backhaul capacity of the BS and the downlink backhaul capacity of the neighbor base stations.

16. The apparatus of claim 11, wherein the transmission controller determines not to transmit the stored data to the target base station when the quantity of stored data is greater than the reference value.

17. The apparatus of claim 11, wherein the reference value is further based on a maximum size of an Automatic Repeat reQuest (ARQ) block and an ARQ window size.

18. The apparatus of claim 11, wherein the transmission controller controls to discard the stored data in the storage.

19. The apparatus of claim 11, wherein the transmitter transmits the stored data to the target base station via a backhaul.

20. The apparatus of claim 11, wherein the stored data is discarded from a line card buffer when the base station determines to not transmit the stored data to the target base station.

* * * * *

UNITED STATES PATENT AND TRADEMARK OFFICE
CERTIFICATE OF CORRECTION

| | | |
|---|---|---|
| PATENT NO. | : 8,290,493 B2 | Page 1 of 1 |
| APPLICATION NO. | : 12/290898 | |
| DATED | : October 16, 2012 | |
| INVENTOR(S) | : Park et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this
Twenty-third Day of September, 2014

Michelle K. Lee
*Deputy Director of the United States Patent and Trademark Office*